United States Patent Office 3,418,306
Patented Dec. 24, 1968

3,418,306
PROCESS FOR THERMALLY DEGRADING POLYETHYLENE
James E. Guillet and Harry W. Coover, Jr., Kingsport, Tenn., assignors to Eastman Kodak Company, Rochester, N.Y., a corporation of New Jersey
No Drawing. Continuation of application Ser. No. 192,965, May 7, 1962. This application Sept. 8, 1966, Ser. No. 578,101
7 Claims. (Cl. 260—94.9)

This invention relates to a novel and improved process for thermally degrading polyethylene. In a specific aspect this invention relates to a novel and improved process for preparing thermally degraded polyethylene products of improved stability, odor, color and hardness.

This is a continuation of our application Ser. No. 192,965 filed May 7, 1962, now abandoned which is a continuation-in-part of our copending application Ser. No. 789,238, filed Jan. 27, 1959, now abandoned.

The commercial production of solid high molecular weight polyethylene was initially limited to high pressure procedures such as those disclosed by Fawcett et al. in U.S. Patent 2,153,553 wherein it is disclosed that ethylene can be polymerized to form a solid waxy polymer at pressures in excess of 500 atmospheres and usually within the range of 1,000 to 2,000 atmospheres. Polyethylene produced in such high-pressure processes has been characterized by high flexibility, good film-forming properties, and a waxy appearance. These high pressure polymerization procedures produce a polyethylene that possesses a high degree of chain branching and the polymer exhibits a relatively low softening temperature, a low density and a relatively low crystallinity.

Recently it has been found that polyethylene can be produced by polymerizing ethylene at considerably lower temperatures and in the presence of certain catalysts. For example, in U.S. Patent 2,691,647 it is disclosed that ethylene can be polymerized in the presence of a catalytic mixture consisting of a supported oxide of chromium, molybdenum, tungsten, or uranium activated by an alkali metal. Similarly, U.S. Patent 2,699,457 discloses that polyethylene can be polymerized in the presence of a catalytic mixture of a metal alkyl or metal alkyl halide such as aluminum triethyl or ethyl aluminum chloride in combination with a compound of a metal from the fourth to the sixth subgroups of the Periodic Table. Also, in more recent years it has been found that an outstanding type of polyethylene can be produced by polymerizing ethylene in the presence of a catalytic mixture consisting of a metal, such as aluminum, and a titanium tetrahalide. The above procedures for producing polyethylene are characterized by the use of comparatively low pressures and the polyethylene produced in accordance with these low pressure procedures possesses a high density, high crystallinity, improved melting point and increased softening temperature and a relatively greater rigidity than polyethylene produced by the high pressure procedures.

It is known that polyethylene produced by either a high-pressure or a low-pressure process can be degraded thermally to produce a product of substantially lower molecular weight. In fact, a thermal degradation process can be used to produce certain types of polyethylene waxes from higher molecular weight polymers. The thermal degradation of polyethylene is frequently carried out in an inert atmosphere, such as under a nitrogen blanket, to prevent the oxidation of the degraded polymer. We have found that degraded polyethylene prepared by prior art procedures possesses a high degree of unsaturation, and as a result the degraded polymer exhibits poor oxidation and weathering stability, and the degraded product has an undesirable odor. Also, the prior art degraded product can undergo undesirable side reactions which lead to the formation of branched molecules of decreased crystallinity and melting point.

It is an object of this invention to provide a novel process for producing an improved degraded polyethylene. It is another object of this invention to provide a novel process for producing an improved thermally degraded polyethylene having an improved oxidation and weathering stability. It is a further object of this invention to provide a novel process for thermally degrading polyethylene to form a product of improved saturation, odor, color and hardness, and resistant to undesirable side reactions. Further and additional objects of this invention will be quite apparent from the detailed description appearing below.

In accordance with this invention, it has been found that a degraded polyethylene of greatly improved physical properties can be produced by degrading the polyethylene at an elevated temperature in a hydrogen atmosphere. The resulting product is highly resistant to oxidation and weathering, it possesses a greatly improved odor, color and hardness and it is resistant to side reactions as a result of greater saturation.

Polyethylene employed in our degradation process can be produced by any of the so-called high-pressure and low-pressure processes. The polyethylene should have a molecular weight in excess of about 10,000, and a density within the range of 0.90 to 0.98 and higher. The polyethylene can be produced by polymerizing ethylene in the presence of any of the known peroxide catalysts and pressures of 500 atmospheres and higher. A suitable procedure for producing high-pressure polyethylene is included in U.S. Patent 2,153,553.

Polyethylene for our process can also be formed by any of the so-called low-pressure procedures resulting in a highly crystalline high molecular weight polymer of high density. In carrying out a low-pressure polymerization reaction any of the known catalysts for polymerizing ethylene to a highly crystalline polymer at low pressures can be used. Among the catalysts that can be employed are the aluminum trialkyl type of catalysts. For example, aluminum triethyl admixed with a titanium tetrahalide, such as titanium tetrachloride, or an aluminum triethyl admixed with a vanadium halide, such as vanadium trichloride, can be used. Another satisfactory catalyst mixture for producing polyethylene in the first step of our process comprises a mixture of sodium amyl and titanium tetrachloride. Also, the metal oxide types of catalyst can be used in practicing this invention. For example, catalysts comprising chromium oxide, and silicon oxide deposited on an activated alumina can be used as well as molybdenum oxide deposited upon an activated form of alumina. It is also possible to use a catalyst mixture comprising vanadium pentoxide deposited on activated alumina. Any of the above-mentioned catalyst mixtures can be employed in the first step of our process.

By way of example, a highly crystalline, high density polyethylene can be formed in a low-pressure process using a catalyst mixture comprising aluminum and titanium tetrachloride to carry out the polymerization reactions. In this process the polymerization reaction is generally carried out in liquid phase in an inert organic liquid, preferably an inert liquid hydrocarbon. The reaction proceeds over a relatively wide temperature range with temperatures of 20 to 200° C. being preferably employed and particularly good results can be obtained at a temperature within the range of 40 to 160° C. The reaction pressure varies from atmospheric pressure to a pressure of about 1000 p.s.i.g., although in some instances, considerably higher pressures can be used if they are considered necessary. The inert organic liquid desirable serves as a liquid medium and a solvent for the solid polyethylene at the temperature of polymerization. The great increase in polymerization rate with increasing pressures makes the use of pressures of 300 to 500 p.s.i.g. quite desirable.

In the polymerization reaction the organic vehicle used is usually an aliphatic alkane or cycloalkane such as pentane, hexane, heptane or cyclohexane. If desired, a hydrogenated aromatic compound such as tetrahydronaphthalene or decahydronaphthalene can be used. Additionally, aromatic hydrocarbons such as benzene, toluene, xylene or the like or a halogenated aromatic compound such as chlorobenzene, chloronaphthalene or orthodichlorobenzene are quite satisfactory. Preferably, the hydrocarbon liquids are employed. Other liquid solvents that can be used include ethyl benzene, isopropyl benzene, ethyl toluene, n-propyl benzene, the diethyl benzenes, mono- and diethyl benzenes, mono- and dialkyl naphthalenes, n-pentane, n-octane, iso-octane, methyl cyclohexane, Tetralin, Decalin and any of the other well-known inert liquid hydrocarbons.

In carrying out the polymerization reaction the amount of liquid vehicle or diluent employed can be varied over rather wide limits with relation to the monomer and catalyst mixture. Best results are obtained using a catalyst concentration of from about 0.01 to about 10% and desirably from 0.1 to 5% by weight of the liquid vehicle. The preferred catalyst concentration is within the range of 0.1 to 2%. The concentration of the monomer in the vehicle can vary rather widely and will usually range from about 2 to 50% by weight, preferably from 2 to 10% by weight of the liquid vehicle. When using a catalyst mixture of aluminum and titanium tetrachloride the relative proportions of the two components of the catalyst will vary from about 1 to 6 molar equivalents of titanium tetrachloride per gram atom of aluminum metal. In order to produce a high molecular weight highly crystalline polyethylene of high density, it is preferable to employ the lower ratios of titanium tetrahalide to aluminum metal. Furthermore, at these conditions it is preferred to employ polymerization temperatures that fall in the lower portion of the temperature ranges set forth above.

When a catalyst mixture comprising sodium amyl and titanium tetrachloride is employed for the polymerization reaction it is preferred to employ low polymerization temperatures, for example, temperatures within the range of −30 to 30° C. with low ratios of titanium tetrachloride to sodium amyl. These catalyst ratios can fall within the range of $\frac{1}{20}$ to $\frac{1}{4}$ mole of titanium tetrachloride to sodium amyl. Under these conditions with this type of catalyst the polyethylene produced has a very high density and an extremely high molecular weight. Also, the polyethylene is insoluble in the more common types of hydrocarbon solvents and it cannot be molded or extruded under the usual conditions employed for such operations.

Polyethylene produced by low-pressure procedures can be highly crystalline, and it usually exhibits a crystallinity of at least 80% as shown by X-ray diagrams. Ordinarily, the crystallinities of the polyethylene produced in the low-pressure processes average about 90% and higher.

The thermal degradation of polyethylene is carried out in our process in the presence of hydrogen. Other inert gases, such as nitrogen, argon, helium, and the like, can be present in the degradation atmosphere with the hydrogen, but it is important to keep the oxygen content of the degradation atmosphere at a minimum in order to avoid oxidation of degraded polyethylene at the temperatures of the thermal treatment.

The amount of hydrogen that is employed during the thermal degradation can vary from about one atmosphere up to about 300 atmospheres. Greater hydrogen pressures can be used, but usually the increased hydrogen pressures are not necessary. In general, it is desirable to use hydrogen at a pressure not in excess of the pressures that can be tolerated by available degradation equipment. A considerable improvement in the degradation of the polyethylene can be realized by conducting the degradation in a stream of hydrogen at atmospheric pressure, but the most desirable results are achieved in the thermal degradation when the process is carried out at a pressure of several hundred p.s.i. The thermal degradation of the polyethylene is usually carried out at a temperature within the range of 250 to 450° C. and generally for a period of time within the range of five minutes to about three hours. It has been noted that the temperature required to produce a thermally degraded polyethylene of a given molecular weight is usually lower when the degradation is carried out in the presence of hydrogen. The use of lower temperatures is desirable since undesirable side reactions which usually occur at the higher temperatures are minimized.

One method of carrying out our thermal degradation process can be illustrated by a batch procedure wherein the polyethylene is heated in an enclosed stirred vessel, and hydrogen gas is continuously passed over the surface of the heated polyethylene. Alternatively, the thermal degradation process can be carried out in a continuous manner by flowing molten polyethylene through a heated tube. A blanket of hydrogen gas is maintained in the degrading tube in order to realize the advantages of our invention. The rate of flow of molten polyethylene through the tube and the size of the tube are so arranged that the polyethylene remains in the heated zone for a period of time sufficient to accomplish the desired degradation.

The thermally degraded products of our invention vary in molecular weight from waxes having a molecular weight in the range of 1,000 to 5,000 plastic-grade products in the molecular weight range of 10,000 to 50,000, and they possess an improved odor, color, and hardness. The products are quite stable toward oxidation and during normal weathering conditions. Consequently, these products are useful in a number of commercial applications. The lower molecular weight polymers of our invention can be used in polishes and to improve the properties of paraffin wax. Mixtures of our low molecular weight polymers and paraffin wax can be used effectively in packaging applications where the mixtures are in contact with food, since the polyethylene produced in our process is substantially odorless and highly resistant to oxidation. The higher molecular weight polymers produced in our process can be used as plastics in molded and extruded objects such as pipe and film. In these uses, the absence of odor and the improved stability to oxidation are important advantages.

The practice of our invention is illustrated by the following examples.

Example 1

200 grams of polyethylene having a molecular weight of 33,000 and a density of 0.918 was placed in a 1-liter autoclave. The autoclave was flushed three times with oxygen-free hydrogen, then pressured to 300 p.s.i.g., and heated to 400° C. for 45 minutes. The autoclave was then cooled and 500 cc. of hexane was added. It was heated to 150° C. to dissolve the polyethylene, then cooled down and vented. The polymer was removed as a granular powder and dried in a circulating air oven at 50° C. The resulting wax had an inherent viscosity of 0.18 in Tetralin at 100° C. and a density of 0.932. The unsaturation was determined by infrared methods similar to those described by Thomson [J. Chem. Soc., 328 (1948)] and Anderson and Seyfried [Ann. Chem., 20, 998 (1948)]. The total unsaturation was 0.01%. The polymer was pure white and had no perceptible odor. The penetration hardness was D55 as measured by ASTM standard procedure.

Example 2

The procedure of Example 1 was repeated except that nitrogen was used in place of hydrogen. The resulting polymer had an inherent viscosity of 0.28 and a density of 0.926. The total unsaturation was 0.41%, and the polymer had a distinct odor. The penetration hardness was D52.

Example 3

The procedure of Example 1 was repeated except that 500 ml. of benzene was added with the polymer charge. In this case it was not necessary to add the hexane to dissolve the polyethylene after the thermal treatment. The resulting polymer had an inherent viscosity of 0.20 and a density of 0.931. The total unsaturation was 0.02%.

Example 4

200 grams of polyethylene having a molecular weight of 50,000 and a density of 0.922 was treated as in Example 1, and heated for 30 minutes at 380° C. at a pressure aof 30 p.s.i.g. hydrogen. The resulting polymer had a molecular weight of 21,000 and an unsaturation of 0.04%. A similar degradation under 30 p.s.i. nitrogen gave a product having a molecular weight of 35,000 and an unsaturation of 0.27%.

Example 5

100 grams of polyethylene having a density of 0.962 and which was insoluble in Tetralin at 140° C. was heated under 500 p.s.i. hydrogen for 10 minutes at 450° C. The resulting polymer had a density of 0.967 and an inherent viscosity in Tetralin of 1.53. The unsaturation was too low to measure by the usual infrared method. The polymer was extremely hard and was practically odorless. It had a melt index of 1.1 and could be injection molded readily into shaped articles. The same polymer, when heated under nitrogen for 10 minutes at 450° C., was still insoluble in Tetralin at 140° C. and had a melt index too low to measure. It could not be injection molded at normal injection molding temperatures. The total unsaturation of this polymer was 0.01%.

Example 6

200 grams of linear polyethylene having a density of 0.936 and an inherent viscosity of 1.62 was melted in a glass flask equipped with a slow moving stirrer and the air displaced with hydrogen. A constant stream of hydrogen was allowed to sweep across the surface of the melt, which was raised gradually to a temperature of 400° C. It was maintained at this temperature for six hours, after which it was allowed to cool down and the polymer removed. The resulting wax was completely odorless, and had a density of 0.975 and an inherent viscosity in Tetralin of 0.10. It had a penetration hardness of 1.2 using a 250 g. weight, and was found to be completely compatible with paraffin wax.

Example 7

The art has recognized that polyethylene can be thermally degraded, and some art as represented by U.S. Patent 2,372,001 has recognized that the product of the thermal degradation reaction can be hydrogenated. The runs reported in this example demonstrate the different and unexpected results that are obtained from our process in contrast to the products of such prior art procedures.

Run A

Five grams of a polyethylene having a melt index of 0.3 and a density of 0.918, and prepared by the process described in U.S. Patent 2,153,533, was placed in a 250 ml. autoclave with 50 ml. benzene and heated to 360° C. for 1 hour under a pressure of 200 p.s.i. of hydrogen. The product was isolated by evaporation of the solvent and was a white hard wax which was non-tacky and had a penetration hardness of 3.6 as measured by ASTM D5–52 (using a 250 g. load) and a Shore Durometer hardness of 56.

Run B

A similar run was made with another sample of the same starting material (i.e. polyethylene prepared in accordance with U.S. 2,153,553) except that the degradation was carried out under 200 p.s.i. nitrogen pressure. The product was a soft tacky semi-solid similar to that described in U.S. 2,372,001, with a penetration hardness of 4.5 and a Durometer hardness of 53. The sample was tacky and dark brown in color. The product was then dissolved in 50 ml. cyclohexane with 1.0 gram of 5% palladium on alumina and heated to 250° C. for 4 hours in the presence of 50 p.s.i. hydrogen. The solution was heated and filtered hot to remove the catalyst, and the polymer isolated by evaporation of the solvent. The product was still dark brown in color and was tacky. The penetration hardness was 7.6 which indicates a considerably softer product than made using hydrogen directly.

Although the invention has been described in considerable detail with reference to certain preferred embodiments thereof, variations and modifications can be effected within the spirit and scope of the invention as described hereinabove and as defined in the appended claims.

What is claimed is:

1. The improved process for producing thermally degraded polyethylene, which comprises heating high molecular weight, solid polyethylene to a temperature within the range of 250 to 450° C. in the presence of hydrogen substantially free of oxygen and in the absence of any hydrogenation catalyst to produce a polymer of decreased molecular weight, said polymer being substantially saturated, odorless and resistant to oxidation.

2. The improved process for producing a thermally degraded polyethylene as in claim 1 wherein the hydrogen is present at a pressure not in excess of 300 atmospheres.

3. The improved process of producing a thermally degraded polyethylene, substantially saturated, odorless and resistant to oxidation which comprises dissolving high molecular weight solid polyethylene in a normally liquid hydrocarbon solvent and contacting polyethylene in said solvent with hydrogen substantially free of oxygen at a temperature within the range of 250 to 450° C. for a period of 5 minutes to 3 hours in the absence of any hydrogenation catalyst.

4. The process according to claim 3 wherein the solvent is hexane.

5. The improved process for producing thermally degraded polyethylene, substantially saturated, odorless and resistant to oxidation which comprises passing molten high molecular weight solid polyethylene into contact with hydrogen substantially free of oxygen at a temperature within the range of 250 to 450° C. for a period of time within the range of 5 minutes to 3 hours in the absence of any hydrogenation catalyst.

6. The process according to claim 5 wherein the polyethylene has a molecular weight in excess of 10,000 prior to degradation.

7. The process according to claim 5 wherein the polyethylene has a density within the range of 0.90 to 0.98 prior to degradation.

No references cited.

JOSEPH L. SCHOFER, *Primary Examiner.*

L. EDELMAN, *Assistant Examiner.*

UNITED STATES PATENT OFFICE
CERTIFICATE OF CORRECTION

Patent No. 3,418,306　　　　　　　　　　　　December 24, 1968

James E. Guillet et al.

It is certified that error appears in the above identified patent and that said Letters Patent are hereby corrected as shown below:

Column 5, line 65, "2,153,533" should read -- 2,153,553 --.

Signed and sealed this 10th day of March 1970.

(SEAL)
Attest:

Edward M. Fletcher, Jr.
Attesting Officer

WILLIAM E. SCHUYLER, JR.
Commissioner of Patents